3,739,064
DIHYDROCHALCONE SWEETENING AGENTS
George P. Rizzi, Springfield Township, Hamilton County, Ohio, assignor to The Procter & Gamble Company, Cincinnati, Ohio
No Drawing. Filed Sept. 30, 1970, Ser. No. 76,972
Int. Cl. A61k 7/16; A23l 1/26
U.S. Cl. 424—49                9 Claims

ABSTRACT OF THE DISCLOSURE

Hesperetin dihydrochalcone, and certain homologs thereof, are dissolved in appropriate organic solvents and aqueous-organic solvents to provide novel sweetening compositions useful in flavoring edible products.

BACKGROUND OF THE INVENTION

This invention relates to compositions for imparting sweetness to food substances without the use of natural sugars. This invention also relates to a method for enhancing the minimal natural sweetness of hesperetin dihydrochalcone, and certain homologs thereof, by dissolution in an appropriate organic solvent or in mixtures of organic solvents and water (aqueous-organic solvents) thereby rendering these aglyconic dihydrochalcones suitable for use as artificial sweetening agents.

Various dihydrochalcone derivatives of naturally occurring compounds, for example, those described by Horowitz and Gentili in U.S. Pat. 3,087,821, have been used as artificial sweetening agents. Of greatest utility as sweeteners are compounds of the general structure

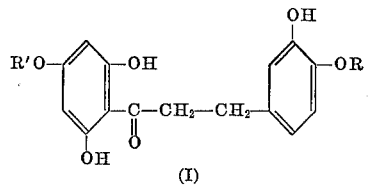

(I)

wherein R is lower alkyl and R' is a sugar. These flavanone glycosides are derivable from compounds found in naturally-occurring sources such as grapefruit and other citrus fruits. Especially important among these sweetening agents are compounds wherein R' is the neohesperidosyl radical. Horowitz and Gentili teach that partial hydrolysis of the neohesperidosyl group, with the removal of the rhamnose moiety, results in the formation of glucosyl dihydrochalcone compounds having an intense sweetness comparable to that of saccharin. The art further teaches that it is necessary that the dihydrochalcones have a sugar substituent in their structures to exhibit any useful degree of sweetness. Complete removal of the sugar group (R') from compounds of structure (I) having substituent R as methyl and replacement of said sugar group with hydrogen yields the aglycone, hesperetin dihydrochalcone, which is characterized as being only moderately sweet. Because of its low level of sweetness, hesperetin dihydrochalcone has not heretofore been employed as a sweetening agent. Surprisingly, however, it has now been discovered that hesperetin dihydrochalcone, when solubilized in the presence of an organic solvent as hereinbelow described, exhibits an enhanced and useful degree of sweetness approximately 100 times that of sucrose. By the practice of this invention, then, hesperetin dihydrochalcone and certain of its homologs are rendered useful as sweetening agents. Moreover, certain of these dihydrochalcones are found to enhance the natural sweetness of various sugars and sugar alcohols, as is disclosed in the concurrently filed applications of Rizzi, entitled Sugar Compositions Containing Aglyconic Dihydrochalcones, Ser. No. 76,974, filed Sept. 30, 1970, and Rizzi and Neely, entitled Sweetening Compositions Containing Aglyconic Dihydrochalcones Ser. No. 76,973, filed Sept. 30, 1970.

Accordingly, it is an object of this invention to provide sweetening compositions containing hesperetin dihydrochalcone and certain homologs thereof having enhanced sweetness. Another object of this invention is to provide artificial sweetening compositions containing solubilized hesperetin dihydrochalcone and solubilized homologs thereof. Still another object is to provide a method for enhancing the sweetness of hesperetin dihydrochalcone and the homologs thereof. These and other objects are obtained by the present invention as will become apparent from the following disclosure.

SUMMARY OF THE INVENTION

The sweetening compositions of this invention comprise hesperetin dihydrochalcone and certain homologs of hesperetin dihydrochalcone dissolved in certain solvents as hereinafter defined. In its process aspects this invention comprises a method for potentiating the sweetness of certain aglyconic dihydrochalcones, and a method for sweetening foods, beverages, dentifrices, chewing gums, mouthwashes and other ingestible compositions.

More specifically, this invention provides sweetening compositions comprising from about a $5 \times 10^{-4}$ molar to about a 2.0 molar concentration of a compound of the formula

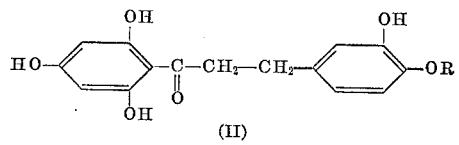

(II)

wherein R is a member selected from the group consisting of methyl, ethyl, isopropyl, propyl and butyl, dissolved in a solvent selected from the group consisting of ingestible polar, organic liquids and mixtures of ingestible polar organic liquids and water, said mixtures containing at least about 0.15% by weight of said ingestible polar, organic liquids.

In addition, this invention provides a process for enhancing the sweetness of compounds of Formula II having as group R a member selected from the group consisting of methyl, ethyl, isopropyl, propyl and butyl, comprising dissolving said compounds in a solvent selected from the group consisting of ingestible polar, organic liquids, and mixtures of ingestible polar, organic liquids and water containing at least about 0.15% by weight of said ingestible polar, organic liquids.

Finally, this invention provides a process for sweetening ingestible materials which comprises dissolving therein a dihydrochalcone compound of Formula II having as group R a member selected from the group consisting of methyl, ethyl, isopropyl, propyl and butyl at a concentration of at least about $5 \times 10^{-4}$ molar. This latter process preferably comprises the steps of: (a) dissolving a dihydrochalcone compound of Formula II in a solvent selected from the group consisting of ingestible polar, organic liquids, and mixtures of ingestible polar, organic liquids and water containing at least about 0.15% by weight of said ingestible polar, organic liquids; and (b) adding the solution of step (a) to an ingestible material until the final concentration of the dihydrochalcone dissolved therein is at least $5 \times 10^{-4}$ molar.

When R in the above Formula II is methyl, the compound is hesperetin dihydrochalcone, which is preferred for use herein. Hesperetin dihydrochalcone can be prepared from hesperidin by hydrolysis in aqueous mineral acid, followed by catalytic hydrogenation, as hereinafter detailed. Alternatively, hesperetin dihydrochalcone glucoside, prepared by the method of Horowitz, U.S. Pat. 3,429,873, can be subjected to further hydrolysis with removal of the β-D-glucose moiety and recovery of the aglycone, hesperetin dihydrochalcone. Likewise, U.S. Pat. 3,375,242 describes a process for condensing naringin with isovanillin to yield neohesperidin chalcone which, on hydrogenation and complete hydrolysis of the sugar, yields hesperetin dihydrochalcone. Hesperetin dihydrochalcone prepared by any of these methods is suitable for use in the practice of the present invention.

When R in Formula II is ethyl, the compound is homo-hesperetin dihydrochalcone which is also preferred herein. When R is propyl, the compound is bis-homohesperetin dihydrochalcone. When R is any of the indicated groups other than methyl, the compounds are homologs of hesperetin dihydrochalcone and are referred to hereinafter as "hesperetin-like" dihydrochalcones. These homologs can be prepared in much the same fashion as hesperetin dihydrochalcone as will be seen hereinafter.

Admixture of the dihydrochalcones having the general Formula II with pure water results in solutions which are almost imperceptibly sweet. Likewise, the solid dihydrochalcones of the above formula are not detectably sweet to the average taster. However, when solubilized by admixture with the proper solvent, as hereinbelow detailed, in the concentration ranges herein noted, these dihydrochalcones are found to exhibit a sweetness level approximately 100 times greater than an equivalent concentration of sucrose. This enhancement of the sweetness of these dihydrochalcones renders the solutions thereof suitable for use as artificial sweeteners.

As will be noted from the organoleptic evaluation data hereinafter detailed, a concentration of about $5 \times 10^{-4}$ molar represents the lower threshold limit for perception of the sweetness of the hesperetin and hesperetin-like dihydrochalcones when solubilized according to the practice of this invention. Thus, to impart a sweet taste to ingestible materials, i.e., foods, beverages and the like, it is necessary to solubilize therein, or to add thereto sufficient pre-dissolved hesperetin dihydrochalcone, or hesperetin-like dihydrochalcone, such that the concentration in the ingestible material is at least $5 \times 10^{-4}$ molar. It will rarely be necessary to exceed a 1.0 molar concentration of the dihydrochalcone; hence, a preferred range of concentrations of dissolved dihydrochalcone in ingestible materials is from about $5 \times 10^{-4}$ molar to about 1.0 molar. A concentration of about $5 \times 10^{-4}$ molar also represents the lowest suitable concentration of the solubilized compounds of Formula II in artificial sweetening compositions. Of course, there is essentially no upper limit to the concentration employed except that in concentrations greater than about one molar, the solutions of the Formula II compounds are not distinguishably sweeter, one from another. However, the more concentrated solutions of these materials offer the advantage that only a few drops need by employed when sweetening other foods and beverages therewith. For practical purposes, the dihydrochalcones having the above-noted Formula II are solubilized according to the process of this invention at concentrations from about $5 \times 10^{-4}$ molar to about 2.0 molar, more preferably from about $1 \times 10^{-3}$ molar to about 1.0 molar, to provide artificial sweetening compositions.

The solvents suitable for solubilizing the dihydrochalcones herein described are any of the polar, organic liquids and water containing said polar, organic liquids in the amounts hereinafter detailed. Of course, when it is desired to prepare artificial sweeteners suitable for prolonged or repeated ingestion by humans it is necessary to use as a solvent for the aglyconic dihydrochalcones of Formula II a polar, organic liquid which is toxicologically acceptable. The hereinafter noted classes of polar, organic liquids which can be used to solubilize hesperetin dihydrochalcone and the hesperetin-like dihydrochalcones can all be ingested to a greater or lesser extent by humans without ill effects. For example, many of the organic acids are found in oxidized fat mixtures and acetic acid is a well-known constituent of vinegar. As hereinafter noted, organic acid esters are major components of most naturally-occurring flavor oils. Mercaptans are found in vegetables such as the onion and garlic, while a variety of polar, organic liquids are known to be present in the so-called "fusel oil" component of alcoholic beverages. Many of these polar, organic liquids cause no ill effects if ingested occasionally and in low concentrations, but some should be avoided if repeated use is anticipated. Accordingly, there are certain preferred polar, organic liquids which can be employed herein singly, in combination one with another and with water, to enhance the sweetness of the hesperetin and hesperetin-like dihydrochalcones used herein and thereby provide sweetening compositions. These preferred, polar, liquid, organic compounds are sometimes hereinafter referred to as ingestible organic solvents. Preferred, ingestible, polar, organic liquid solvents suitable for use herein, singly, in admixtures and with water for the preparation of artificial sweetening compositions containing hesperetin dihydrochalcone and the hesperetin-like dihydrochalcones include the ingestible members of the hereinafter disclosed classes of polar, organic liquids, especially those detailed in the list of permitted food additives periodically prepared and issued by the United States Food & Drug Administration and published in the Federal Register, and commonly referred to as the GRAS (Generally Recognized As Safe) list.

Another group of ingestible organic solvents useful herein are the polar, organic liquids classified as safe for limited use in foods under the provisions of regulation 121.1164 of the U.S. Food and Drug Administration. A wide variety of ingestible polar, organic liquids are in this category. For example, certain liquid alcohols and glycols, low molecular weight organic acids (i.e., $C_2$-$C_{10}$) organic acid esters, aldehydes, and ketones, aromatic as well as aliphatic and mixtures thereof, serve to solubilize the dihydrochalcones and can be used herein, either alone or in mixtures. Ketones such as acetophenone, 3-decen-2-one, isopulegone and the like, all dissolve the dihydrochalcones used herein, enhance their sweetness and provide artificial sweetening compositions. Aldehydes such as benzaldehyde, decanal, and the like, are similarly useful herein. A variety of alcohols can also be used to dissolve the compounds of Formula II used in the practice of this invention to thereby enhance their sweetness and to form artificial sweetening compositions. Ethyl alcohol, cedrol, 3-hexen-1-ol, neopentyl alcohol, 1-decanol, sorbitan monooleate polyoxyethylene and the like, are all suitable for use singly, in admixture one with another, and in water, to solubilize the dihydrochalcones and thereby provide artificial sweetening compositions.

The liquid organic esters of the formula R"COOR", wherein R" represents straight-chain and branched alkyl groups having 1 to 10 carbon atoms, are a preferred class of solvents for use herein. The usefulness of such esters arises both because of their good solvent properties and by virtue of the fact that many esters are suitable for prolonged ingestion, themselves being major components of most natural flavor oils. Non-limiting examples of esters useful as ingestible polar, organic liquid solvents herein include: pentyl pentanoate, isobutyl formate, ethyl acetate, amyl valerate, isoamyl valerate, butyl butyrate, isobutyl propionate, isoamyl decanoate, ethyl propionate, ethyl butyrate, isoamyl acetate and isobutyl valerate all of which are suitable for use singly, in admixtures, and with water, in the instant invention.

Similarly, various naturally-occurring and synthetically-reconstituted flavor oils which are obtainable from plants are suitably employed to solubilize the dihydrochalcones used in this invention and to enhance the sweetness thereof. It is not possible to specify with certainty the compositions of these various oils other than that they are highly complex liquid mixtures containing polar compounds such as lactones, ketones, aldehydes, thiols, acids and acid esters. Some flavor oils contain nitriles, imides, organonitrates and the like. A long history of use by humans has shown that such flavor oils are physiologically acceptable and they are thus also preferred for use as ingestible organic solvents herein. Often, such flavor oils are employed with ethyl alcohol and propylene glycol to provide various extracts, tinctures and concentrates containing said oils and it is a contemplated mode of the practice of this invention that such solutions can be used to solubilize the dihydrochalcones employed herein so as to enhance their sweetness properties and provide sweetening compositions. These naturally-occurring, ingestible organic solvent oils can also be used with water and any of the above-noted preferred liquids as a co-solvent. Non-limiting examples of flavor oils suitable for employment as solubilizing agents for hesperetin dihydrochalcone and the hesperetin-like dihydrochalcones include: oil of sweet birch, oil of spearmint, oil of wintergreen, oil of sassafras, cedar wood oil, anise oil, pine oil, dill oil, celery seed oil, various citrus oils including lemon, orange, lime, tangerine and grapefruit oils, clove oil, peppermint oil, cassia, carrot seed oil, cola concentrate, ginger oil, angelica oil and the like, singly and in admixtures, and all such oils can be used in the practice of this invention to dissolve hesperetin dihydrochalcone and the hesperetin-like dihydrochalcones and thereby enhance their sweetness. These oils are obtained from the appropriate plant sources by extraction in the manner well-known to those skilled in the art.

Any of the above-described ingestible polar, organic liquids can be used in conjunction with water to provide aqueous-organic solvent systems which enhance the sweetness of compounds of Formula II and which, when the hereinbefore noted amount of the dihydrochalcone of Formula II is dissolved therein, provide useful artificial sweeteners. For example, hesperetin dihydrochalcon can be dissolved in ethyl alcohol and then diluted with water to yield a 0.002 molar solution of said dihydrochalcone containing five percent ethyl alcohol, which composition is suitable for sweetening foods and beverages. In like fashion, ethyl acetate can be used to dissolve hesperetin dihydrochalcone and can be diluted thence with water to yield a composition containing about a 0.1 molar concentration of dihydrochalcone, said composition being likewise suitable for sweetening foods and beverages. Alternatively, hesperetin dihydrochalcone can be dissolved in pure ethyl alcohol at a 1.0 molar concentration and the solution employed as a sweetening composition. Thus, it is seen that dissolution of the dihydrochalcones of Formula II in polar, organic liquids, in mixtures thereof, and in mixtures thereof and water, results in solutions suitable for use as artificial sweetening agents.

Especially preferred ingestible solvents used herein are orange oil, tangerine oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate and sorbitan monooleate polyoxyethylene, both singly, in combination and in combination with water.

Dissolution of hesperetin dihydrochalcone and the hesperetin-like dihydrochalcones so as to enhance their sweetness can be accomplished by simple admixture with any of the appropriate ingestible polar, organic liquids. Gentle warming can be employed to speed the rate of dissolution but this is entirely optional as the compounds of Formula II are found to be quite soluble in the above-noted ingestible organic solvents. When heating is employed, temperatures of from 40° C. to 90° C. are suitable. Preparation of aqueous-organic solutions of hesperetin dihydrochalcone and the hesperetin-like dihydrochalcones can be accomplished either by dissolving the dihydrochalcone in the ingestible polar, organic liquid and admixing the resulting solution with water, or by simply adding the dihydrochalcone to a mixture of water and ingestible organic solvent. Both of these methods are suitably employed in the practice of this invention but it is usually found to be quicker to dissolve the dihydrochalcone in the ingestible polar, organic liquid and then to admix the resulting solution with water. The amount of organic solvent required to dissolve the dihydrochalcones employed herein is not critical since any of the above-named solvents will dissolve sufficient material to provide compositions more than $5 \times 10^{-4}$ molar in dihydrochalcone. Generally, ratios of ingestible organic solvent: dihydrochalcone of about 1:1, and greater, are suitable. When aqueous-organic solvent systems are employed to dissolve the hesperetin and hesperetin-like dihydrochalcones, the total concentration of ingestible polar, organic liquid needed to insure solubility of the dihydrochalcone in the water depends to some extent on the amount of dihydrochalcone to be dissolved. In general, a ratio of one part dihydrochalcone to one part ingestible polar, organic liquid will insure solubility of said dihydrochalcone in water. However, the total concentration of ingestible polar, organic liquid solvent in the resulting solution should be at least 0.15%, more preferably, at least 0.25%, by weight of total solvent.

As hereinbefore noted, many of the ingestible polar, organic liquids which can be used to solubilize hesperetin dihydrochalcone and the hesperetin-like dihydrochalcones, especially the esters, have flavor properties of their own and are recognized as being major constituents in many natural flavor oils. Thus, when such solvents are used herein, even at a low concentration, they will impart to the food being sweetened some of their own flavor; this is sometimes desirable. However, when it is desired to prepare artificial sweetening compositions containing hesperetin dihydrochalcone and hesperetin-like dihydrochalcones having essentially no flavor sensation other than that of sweetness, it is necessary to employ as the ingestible organic solvent for the dihydrochalcone a material having little, or no, flavor properties of its own. Of course, the compounds must serve to solubilize and enhance the sweetness of the hesperetin dihydrochalcone and hesperetin-like dihydrochalcones. Two ingestible organic solvents which fulfill these requirements are ethyl alcohol and 1,2-dihydroxypropane and these solvents are preferred for use herein when it is desired to prepare artificial sweetening compositions having no additional flavor properties. Of course, such sweetening compositions prepared with ethyl alcohol or 1,2-dihydroxypropane can be flavored by the addition of flavor oils, if so desired.

The useful concentration of 1,2-dihydroxypropane in the sweetening compositions containing dihydrochalcones having Formula II is limited by the astringency of this compound. For this reason, sweetening compositions containing this solvent should contain no more than about three percent of the 1,2-dihydroxypropane, the remainder of the solvent being water or ethyl alcohol. Alternatively, more concentrated solutions of 1,2-dihydroxypropane, or the compound itself, can be used in the preparation of concentrated sweetening compositions which, in use, are diluted so that the amount of 1,2-dihydroxypropane in the sweetened food is below the astringency level.

When ethyl alcohol is selected as the ingestible polar, organic liquid solvent for use in this invention it can be used singly and in various proportions with water. It is to be noted that the dihydrochalcones of Formula II are highly soluble in ethyl alcohol and water-ethanol mixtures. Solutions of the dihydrochalcones of the concentrations hereinbefore disclosed in pure ethanol, and in ethanol-water mixtures containing from about 0.15% to 99% ethanol, are all suitable for use as sweetening compositions.

When it is desired to sweeten ingestible materials such as foods, beverages, candies, confections, oral compositions and the like, flavored by the addition of natural or synthetic flavoring oils, the dihydrochalcones of Formula II can be simply dissolved in said flavor oils prior to use. Thus, the resulting food or beverage is flavored and sweetened simultaneously by the addition of the flavor oil-solubilized dihydrochalcone and no solvent, other than the flavor oil, is required. Of course, any of the hereinbefore disclosed organic solvents can be used as a cosolvent, if so desired.

The following procedures illustrate the preparation of hesperetin dihydrochalcone and hesperetin-like dihydrochalcones which, when suitably solubilized according to the process of this invention, exhibit a marked enhancement of their sweetening properties and provide artificial sweetening compositions.

PREPARATION OF HESPERETIN DIHYDROCHALCONE

A solution of hesperidin (25 g.) in 125 ml. of 10% aqueous potassium hydroxide was allowed to remain at 25° C. for 30 minutes. Then, 2.0 g. of 10% Pd/charcoal catalyst was added and the mixture was hydrogenated on a pressure apparatus for 18 hours under 40 p.s.i.g. $H_2$ pressure. The hydrogenation mixture was filtered to remove the catalyst and the volume of filtrate was adjusted to 300 ml. by adding water. Then, 2.5 ml. of concentrated HCl were added and the mixture was refluxed for five hours. The reaction mixture was cooled to 25° C. and extracted with three-250 ml. portions of ethyl acetate. Evaporation of the ethyl acetate under reduced pressure gave a reddish/yellow oil which was subsequently suspended in water (about 100 ml.) and extracted twice with 250 ml. portions of diethyl ether. Evaporation of the ether under reduced pressure gave crude, crystalline hesperetin dihydrochalcone which was then recrystallized from 2:1 ethanol/water to yield (after vacuum drying at 25° C.) 11.32 g. (90% yield based on hesperidin) of pure hesperetin dihydrochalcone. A sample of hesperetin dihydrochalcone which was recrystallized repeatedly (four times) from 2:1 ethanol/water and dried two hours at 56° C. under 0.1 mm. Hg pressure had a melting point of 144–146° C. (dec.).

*Analysis:* Calcd. for $C_{16}H_{16}O_6 \cdot \frac{1}{2}H_2O$ (percent): C, 61.4; H, 5.4. Found (percent): C, 61.8, 61.9; H, 5.9, 5.7.

PREPARATION OF HOMOHESPERETIN DIHYDROCHALCONE

A mixture of 1.0 g. of homoneohesperidin, M.P. 219–223° C., prepared by the method of Krbechek, et al., J. Agr. Food Chem., 16, 180 (1968), 25 ml. water, 25 ml. ethanol and 0.5 ml. of concentrated $H_2SO_4$ was refluxed for 72 hours. The cooled (25° C.) reaction mixture was diluted with water and extracted three times with ethyl acetate (about 100 ml. each time). The ethyl acetate solution was dried over anhydrous $MgSO_4$, filtered to remove drying agent and concentrated under reduced pressure to yield a brownish oil. The oil was crystallized from aqueous isopropanol to yield 0.207 g. (42% yield) of homohesperetin having an M.P. of 85–88° C. The product was shown to be homogeneous by thin layer chromatography. The $^1H$ NMR spectrum obtained in DMSO —$d^6$ supported the structure claimed in that the following signals were observed: $\delta$ 0.79, triplet, J=6 Hz. and $\delta$ 0.24 quartet, J=6 Hz. (ethoxy group), the ratio of methyl/methylene/aromatic protons was in the expected ratio of 3:2:5.

The homohesperetin, 0.173 g. (M.P. 85–88° C.), was then dissolved in 20 ml. of 8.5% aqueous KOH, 0.143 g. of 10% Pd/charcoal catalyst was added and the mixture was hydrogenated with $H_2$ under atmospheric pressure for 4.0 hours during which time one molar equivalent of hydrogen was absorbed. The reaction mixture was filtered and the filtrate was acidified by adding 4 N HCl (pH ca. 2). The white precipitate which separated was collected by filtration and dried in air. The dried product comprised 0.117 g. (67% yield) of homohesperetin dihydrochalcone with a melting point of 96.5–97.5° C. The compound was shown to be homogeneous by thin layer chromatography and its structure was verified by $^1H$ NMR analysis in DMSO —$d^6$ solution: $\delta$ 0.69 triplet, $\delta$ 0.22 quartet (ethoxy group), $\delta$ 0.17, four broad peaks due to adjacent methylenes flanked by a carbonyl group and an aromatic ring, and by infrared analysis of a sample in KBr: broad absorption at 6.25–6.45$\mu$ (strongly hydrogen bonded carbonyl group, typical of phloroacetophenone type molecules).

PREPARATION OF BIS-HOMOHESPERETIN DIHYDROCHALCONE

One mole of 3-hydroxy-4-n-propoxybenzaldehyde is condensed with one mole of 4'-$\beta$-neohesperidosyl-phloroacetophenone in the presence of 0.25 mole of KOH in ethanol solvent. The resulting chalcone is cyclized to a flavanone glycoside by refluxing in dilute mineral acid (1 M HCl). Prolonged boiling of the flavanone glycoside in stronger mineral acid (one hour, refluxing 3 M HCl) cleaves the sugar and yields the aglyconic material, bis-homohesperetin. The bis-homohesperetin is contacted with 10% aqueous KOH at room temperature for 30 minutes then hydrogenated in the presence of a Pd/charcoal catalyst and refluxed with concentrated HCl for three hours. Following ether extraction, the crude product, recrystallized from aqueous ethanol, proves to be bis-homohesperetin dihydrochalcone.

The 3-hydroxy-4-n-propoxybenzaldehyde is replaced by an equivalent amount of 3-hydroxy-4-isopropoxy benzaldehyde and 3-hydroxy-4-n-butoxybenzaldehyde, respectively, and the isopropoxy and butoxy compounds, iso-homohesperetin dihydrochalcone and butoxy-homohesperetin dihydrochalcone, are secured.

ORGANOLEPTIC EVALUATIONS

As hereinbefore noted, aqueous solution of hesperetin dihydrochalcone and the hesperetin-like dihydrochalcones are almost imperceptibly sweet, but, when properly solubilized with ingestible organic solvents according to the process of this invention, the sweetness of these compounds is enhanced and the solutions are suitable for use as artificial sweetening compositions. This enhanced sweetness of solutions of hesperetin dihydrochalcone and the hesperetin-like dihydrochalcones, properly solubilized as herein disclosed, was evaluated and a relative scale of sweetness established for these solutions when compared with other sweetening agents. These relative values were determined by a panel of 10 volunteer tasters who sampled solutions of various sweetening agents at various concentrations to establish a lower threshold concentration for the perception of sweetness. The data in Table I indicate the relative sweetness of some of the materials tested.

TABLE I.—RELATIVE SWEETNESS OF AQUEOUS SOLUTIONS OF SELECTED SUGAR SUBSTITUTES AT 25° C.

| Substance | Taste threshold concentration (molar) | Approximate relative sweetness (molar basis) |
|---|---|---|
| Sucrose (standard) | 4–6×10⁻² | 1 |
| Sodium saccharin | 8–10×10⁻⁵ | 560 |
| Naringin dihydrochalcone | 6–10×10⁻⁴ | 63 |
| Neohesperidin dihydrochalcone | 6–10×10⁻⁵ | 630 |
| Homoneohesperidone dihydrochalcone | 2–6×10⁻⁵ | 1,260 |
| Bis-homoneohesperidin dihydrochalcone | 1–4×10⁻⁴ | 200 |
| Hesperetin dihydrochalcone glucoside | 1–4×10⁻⁴ | 200 |
| Hesperetin dihydrochalcone | (¹) | (²) |
| Hesperetin dihydrochalcone plus 2.5% ethyl alcohol | 5×10⁻⁴ | 100 |

¹ Saturated.
² Almost imperceptible.

As can be seen from Table I, hesperetin dihydrochalcone, properly dissolved in the presence of a small amount of ethyl alcohol, results in the formation of a solution which is about 100 times sweeter than an equivalent molar concentration of the standard sugar, sucrose. (The sweetness of sucrose is not enhanced by ethyl alcohol.)

This enhanced sweetness of hesperetin dihydrochalcone is also noted when the compound is dissolved in any of the hereinbefore disclosed organic solvents and solvent mixtures. For example, 5 parts of hespertin dihydrochalcone can be dissolved in a mixture of 95 parts of water and 5 parts of ethyl acetate to yield a solution which is about 100 times as sweet as an equal concentration of sucrose when so dissolved. Likewise, a solution consisting of 1 part hesperetin dihydrochalcone, 2 parts of 1,2-dihydroxypropane and 98 parts of water is about 100 times as sweet as an equal concentration of sucrose. A solution consisting of 2 parts of hesperetin dihydrochalcone dissolved in a solvent consisting of 1 part ethyl alcohol, 1 part benzaldehyde, and 97 parts water exhibits a sweetness about 100-fold greater than an equivalent amount of sucrose when so dissolved.

It will be seen that sweetening compositions are obtained when from about $5 \times 10^{-4}$ molar to about 2.0 molar, more preferably from about $1 \times 10^{-3}$ molar to about 1.0 molar, concentrations of the hereinabove described dihydrochalcones are dissolved in ingestible polar, organic liquids, mixtures thereof, and in water containing a concentration not less than about 0.15%, more preferably not less than about 0.25% by weight, of said ingestible polar, organic liquids.

The following examples are sweetening compositions which can be prepared by solubilizing hesperetin dihydrochalcone and hesperetin-like dihydrochalcones in ingestible organic solvents and mixtures of said solvents with water, and their manner of preparation. The examples are only for the purpose of illustration and are not intended to limit the scope of the invention.

EXAMPLE I

Five grams of hesperetin dihydrochalcone are dissolved in 100 g. of ethyl alcohol and 1000 g. of water is admixed therewith. The resulting solution is suitable for use as a sweetening composition without further treatment.

EXAMPLE II

Three-fourths gram of hesperetin dihydrochalcone is dissolved in 20 g. of 1,2-dihydroxypropane with gentle warming and 1000 g. of water is added thereto. The resulting solution is suitable for use as a sweetening composition without further treatment.

EXAMPLE III

A concentrated, non-aqueous sweeting composition having an intense sweetness is prepared in the following manner: 10 g. of hesperetin dihydrochalcone is dissolved in 100 g. of ethyl alcohol. The resulting solution is suitable, without further treatment, for use as a highly concentrated sweetening composition.

The hesperetin dihydrochalcone is replaced by an equivalent amount of iso-homohesperetin dihydrochalcone and butoxy-homohesperetin dihydrochalcone, respectively, and sweetening compositions are secured.

EXAMPLE IV

One-half gram of homohesperetin dihydrochalcone is dissolved in a mixture of 1000 g. of water and 50 g. of sorbitan monooleate polyoxyethylene with gentle warming. The resulting solution is suitable for use as a sweetening composition without further treatment.

EXAMPLE V

A vanilla-flavored sweetening composition suitable for simultaneously sweetening and flavoring foodstuffs is prepared as follows: one part hesperetin dihydrochalcone is dissolved in ten parts vanillin and 50 parts ethyl alcohol added thereto.

EXAMPLE VI

One-half part of hesperetin dihydrochalcone is dissolved in 10 parts bitter almond oil and the resulting solution is suitable, without further treatment, for use as an almond-flavored sweetening composition.

EXAMPLE VII

One-tenth part of homohesperetin dihydrochalcone is dissolved in 10 parts of isoamyl acetate and the resulting solution provides a banana-flavored sweetening composition.

EXAMPLE VIII

One-half part of hesperetin dihydrochalcone is dissolved in 20 parts of isoamyl valerate and the resulting solution diluted with 100 parts of a 1:1 mixture of ethanol and water to provide an apple-flavored sweetening composition.

EXAMPLE IX

Two parts of bis-homohesperetin dihydrochalcone are dissolved in 20 parts of butyl butyrate to provide a pineapple-flavored sweetening composition.

EXAMPLE X

One-thirty-second part of hesperetin dihydrochalcone is dissolved in 1 part of isobutyl propionate to provide a rum-flavored sweetening composition.

EXAMPLE XI

One-tenth part of hesperetin dihydrochalcone is dissolved in a synthetic pineapple oil (corresponding to winter fruit) consisting of 2.91 parts ethyl acetate, 0.61 part acetaldehyde, 0.45 part methyl n-valerate, 0.60 part methyl isovalerate, 1.40 parts methyl isocaproate and 0.75 part methyl caprylate to provide a pineapple-flavored sweetening composition.

EXAMPLE XII

A sweetening composition having a spearmint flavor is prepared as follows: $5 \times 10^{-4}$ moles of homohesperetin dihydrochalcone are dissolved in 1000 ml. of water containing 0.15% spearmint oil by heating for 10 minutes at 60° C.

The spearmint oil is replaced by an equivalent amount of oil of sweet birch, oil of wintergreen, oil of sassafras, cedarwood oil, anise oil, pine oil, dill oil, celery seed oil, lemon oil, orange oil, lime oil, clove oil, peppermint oil, tangerine oil, cassia, carrot seed oil, angelica oil, cola concentrate and ginger oil and mixtures thereof, respectively, and sweetening compositions are secured.

EXAMPLE XIII

A sweetening composition is prepared as follows: 1 mole of hesperetin dihydrochalcone is dissolved in 500 ml. of ethyl alcohol and 10 ml. of orange oil added thereto.

The orange oil is replaced by an equivalent amount of lemon oil, lime oil, tangerine oil, grapefruit oil, spearmint oil, peppermint oil and clove oil, respectively, and sweetening compositions are obtained.

As illustrated by the foregoing, compounds of Formula II, dissolved in appropriate organic and aqueous-organic solvents, provide both flavored and unflavored sweetening compositions. These sweetening compositions, can, themselves, be ingested but are more often used to sweeten other ingestible materials such as foods, beverages, confections and the like. It will be recognized that dissolution of hesperetin and hesperetin-like dihydrochalcones of Formula II in concentrations of $5 \times 10^{-4}$ molar, or greater, in ingestible materials will impart sweetness thereto. However, very few foods contain quantities of uncombined polar, organic liquids sufficient to solubilize the dihydrochalcones properly. Hence, it is preferable to sweeten ingestible materials by adding thereto, and solubilizing therein, compounds of Formula II predissolved in the manner and in the solvents as hereinbefore detailed. Accordingly, a preferred method aspect of the present invention comprises adding to an ingestible material, i.e., a food, beverage, confection, candy and the like, a compound of Formula II dissolved, respectively, in an ingestible organic solvent, in mixtures of said solvents, and in water containing at least 0.15%, by weight, of said ingestible organic solvents and solvent mixtures such that the total concentration of dihydrochalcone dissolved in the ingestible material is $5 \times 10^{-4}$ molar, or greater. The following examples of foods, beverages and the like, sweetened in this fashion are for the purpose of illustration and are not intended to be limiting of this method aspect of the present invention.

EXAMPLE XIV

A sweetened carbonated beverage is prepared as follows: 0.2 part lemon oil, 0.2 part hesperetin dihydrochalcone, 0.1 part phosphoric acid and 95.1 parts carbonated water are mixed.

The lemon oil is replaced by an equivalent amount of lime oil, orange oil, tangerine oil, grapefruit oil, spearmint oil, oil of wintergreen, peppermint oil, oil of sassafras, cedarwood oil, anise oil, carrot seed oil, ginger oil, angelica oil, cassia, celery seed oil and cola concentrate and mixtures thereof, respectively, and beverages of the corresponding flavors are obtained.

The hesperetin dihydrochalcone is replaced by an equivalent amount of homohesperetin dihydrochalcone, bis-homohesperetin dihydrochalcone, iso-homohesperetin dihydrochalcone and butoxy-homohesperetin dihydrochalcone, respectively, and sweetened beverages are obtained.

EXAMPLE XV

A sweetened orange juice concentrate is prepared as follows: 80% of the water from expressed orange juices is removed by flash evaporation; a sweetening composition consisting of 1 part homohesperetin dihydrochalcone dissolved in 2 parts 1,2-propylene glycol and 97 parts water is then added to the orange juice concentrate in the ratio of 10 parts orange concentrate to 1 part sweetening composition.

EXAMPLE XVI

A sweetened pastry topping is prepared as follows: 0.1 part of homohesperetin dihydrochalcone is dissolved in 10 parts bitter almond extract and the resulting solution is admixed with a glaze prepared from equal parts water, cornstarch and sorbitan monooleate polyoxyethylene.

EXAMPLE XVII

Brewed coffee and tea are sweetened as follows: a sufficient volume of the sweetening composition described in Example I is added to coffee and tea, respectively, such that the final concentration of dissolved hesperetin dihydrochalcone in the brewed beverage is $5 \times 10^{-4}$ molar, or greater, according to taste.

EXAMPLE XVIII

A sweetened gelatin dessert is prepared as follows: a sufficient volume of the sweetening composition described in Example II is added to a liquified gelatin solution such that the final concentration of dissolved hesperetin dihydrochalcone in the solution is $5 \times 10^{-4}$, molar or greater, according to taste; the solution is gelled by chilling.

EXAMPLE XIX

A sweet-sour salad dressing is prepared as follows: to 100 parts vinegar is added 0.1 part bis-homohesperetin dihydrochalcone, 0.1 part 3-decen-2-one and 150 parts liquid salad oil.

What is claimed is:

1. A food, dentifrice or mouthwash composition comprising: (a) at least 0.15% by weight of an ingestible polar, organic liquid; and (b) at least about a $5 \times 10^{-4}$ molar concentration of a dihydrochalcone compound of the formula

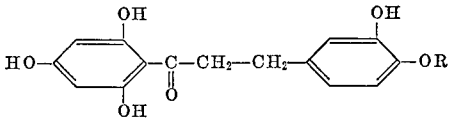

wherein R is a member selected from the group consisting of methyl, ethyl, isopropyl, propyl and butyl dissolved in said polar organic liquid.

2. A composition according to claim 1 wherein the ingestible polar, organic liquid is selected from the group consisting of liquid alcohols, glycols, low molecular weight organic acids, organic acid esters, aldehydes, ketones and mixtures thereof.

3. A composition according to claim 1 wherein the ingestible polar, organic liquid is a member selected from the group consisting of ethyl alcohol, 1,2-dihydroxypropane, acetic acid, ethyl acetate, sorbitan monooleate polyoxyethylene, isoamyl acetate, isoamyl valerate, butyl butyrate, isobutyl propionate and mixtures thereof.

4. A composition according to claim 1 wherein the ingestible polar, organic liquid is a member selected from the group consisting of oil of sweet birch, oil of spearmint, oil of wintergreen, oil of sassafras, cedarwood oil, anise oil, pine oil. dill oil, celery seed oil, lemon oil, orange oil, lime oil, grapefruit oil, clove oil, peppermint oil, tangerine oil, cassia, carrot seed oil, cola concentrate, ginger oil and angelica oil and mixtures thereof.

5. A composition according to claim 1 wherein the dihydrochalcone compound is hesperetin dihydrochalcone.

6. A composition according to claim 1 wherein the dihydrochalcone compound is hesperetin dihydrochalcone and the ingestible polar, organic liquid is a member selected from the group consisting of ethyl alcohol, 1,2-dihydroxypropane, orange oil, lemon oil, lime oil, tangerine oil, grapefruit oil, spearmint oil, clove oil, peppermint oil, and mixtures thereof.

7. A process for sweetening ingestible materials comprising the steps of: (a) dissolving a dihydrochalcone compound of the formula

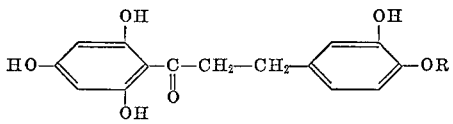

wherein R is a member selected from the group consisting of methyl, ethyl, isopropyl, propyl and butyl, in a solvent selected from the group consisting of ingestible polar, organic liquids, and mixtures of ingestible polar, organic liquids and water, said mixtures containing at least about 0.15% by weight of said ingestible polar, organic liquids; and (b) adding the solution of step (a) to an ingestible material until the final concentration of the dihydrochalcone compound dissolved therein is at least $5 \times 10^{-4}$ molar.

8. A process according to claim 7 wherein the solvent is a member selected from the group consisting of natural flavor oils, ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

9. A process according to claim 7 wherein the dihydrochalcone compound is selected from the group consisting of hesperetin dihydrochalcone and homohesperetin dihydrochalcone.

References Cited

UNITED STATES PATENTS 3,429,873   2/1969   Horowitz et al. _____ 260—210 F

JOSEPH M. GOLIAN, Primary Examiner

U.S. Cl. X.R.

99—141 A